United States Patent [19]

Henninger

[11] Patent Number: 4,671,310

[45] Date of Patent: Jun. 9, 1987

[54] FLOW CONTROL VALVE

[75] Inventor: Stephen R. Henninger, Nazareth, Pa.

[73] Assignee: Fuller Company, Bethlehem, Pa.

[21] Appl. No.: 865,309

[22] Filed: May 21, 1986

[51] Int. Cl.⁴ .......................... F16K 51/00; F16K 1/16
[52] U.S. Cl. ...................................... 137/242; 251/57;
251/298; 251/363; 277/24
[58] Field of Search ............... 251/298, 299, 314, 363,
251/300–303, 251; 277/24; 137/242

[56]  References Cited
U.S. PATENT DOCUMENTS

| 1,517,786 | 12/1924 | Kus | 251/300 |
|---|---|---|---|
| 2,806,489 | 9/1957 | Armstrong | 251/301 |
| 3,416,768 | 12/1968 | Welch | 251/314 |
| 3,916,949 | 11/1975 | Armstrong | 251/298 |
| 4,144,902 | 3/1979 | Mahr et al. | 251/298 |
| 4,498,492 | 2/1985 | Carpentier | 251/298 |
| 4,552,335 | 11/1985 | Alexander et al. | 251/363 |

Primary Examiner—Martin P. Schwadron
Assistant Examiner—Sheri M. Novack
Attorney, Agent, or Firm—Frank H. Thomson

[57] ABSTRACT

A valve for controlling the flow of particulate material through a conduit which may be referred to as a clam shell valve including and arcuate valve plate. The valve includes a seal block having a recess for receiving the leading edge of the valve plate to assure a seal between the conduit and the valve element. The seal block is shaped to inhibit the entrance of material into the seal block and allow for the easy discharge of that material on opening of the valve element. The valve also includes an upper wiper seal element for cleaning the surface of the valve.

8 Claims, 3 Drawing Figures

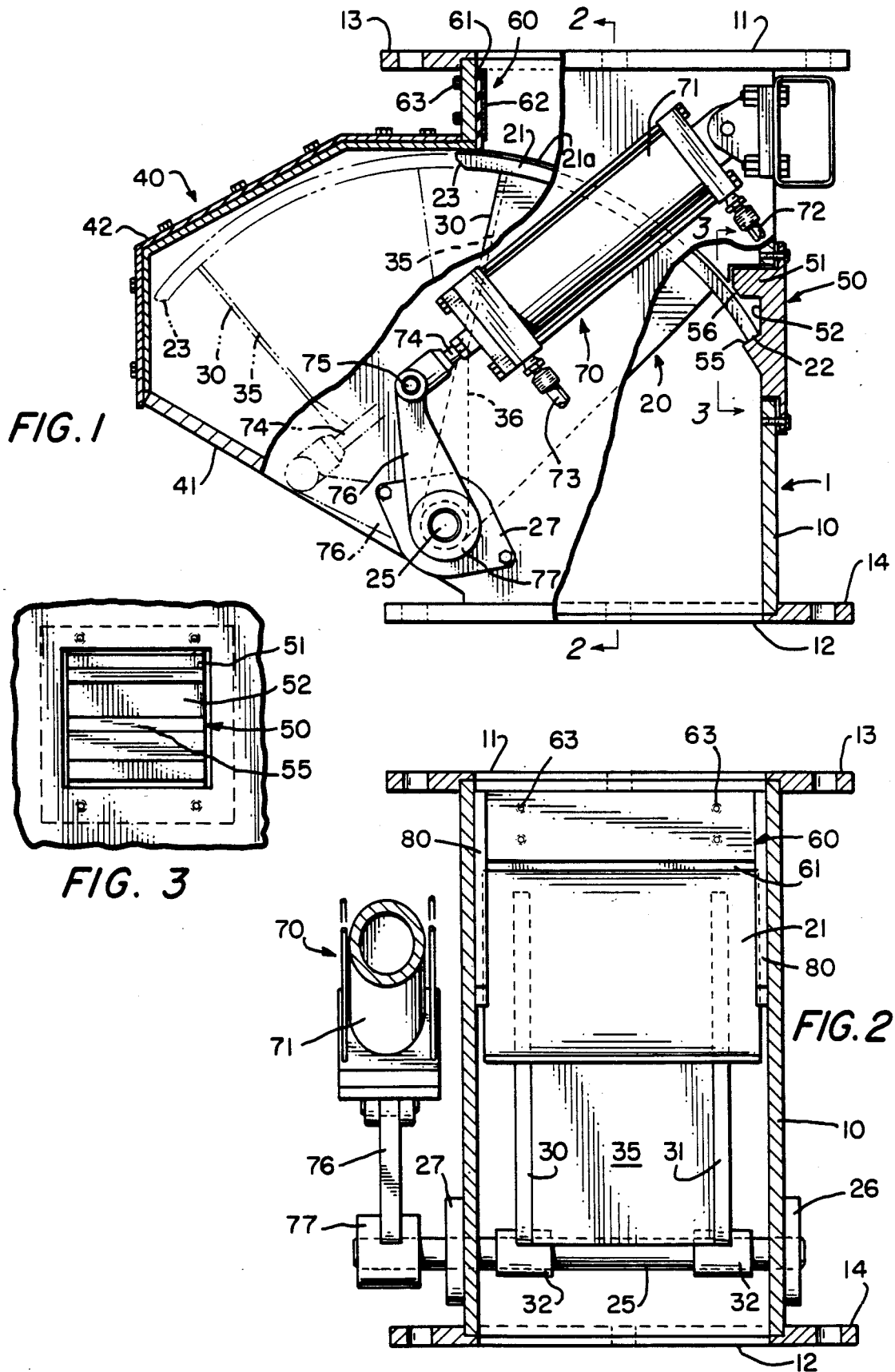

FLOW CONTROL VALVE

BACKGROUND OF THE INVENTION

This invention relates to flow control valve particularly suited for controlling the flow of solid particulate material through a conduit and sealing that conduit. The valve is of a type referred to as a clamshell valve.

The valve of the present invention is particularly designed for controlling the flow of dusty particulate material and is suitable for attachment to the bottom of a hopper for dust. One specific application of the invention is for use in a cement clinker cooler at the outlet of the hopper in the undergrate compartment.

In grate type cement clinker coolers, a bed of hot material discharged from a rotary kiln is supported on a grate system consisting of rows of alternating fixed and movable grate plates, each having a plurality of holes therethrough. Air under pressure is supplied to a plenum chamber below the grates for passage upwardly through the holes in the grate and the bed of material to cool the hot material. Fine particles of cement clinker may fall through the grates into the lower plenum chamber. Typically, there are hoppers at the bottom of the lower plenum chamber to collect the dust. Periodically, these hoppers must be emptied.

Prior to the present invention, it was common practice to utilize either slide gates or double tipping valves at the outlet of these hoppers which valve are capable of not only controlling the flow of material through the outlet of the hopper or conduits associated therewith, but also must seal against the air pressure in the plenum chamber during cooler operation.

Prior to the present invention, clamshell valves were known including a valve plate in the form of an arc with the outer surface of the arc being exposed to the dust or particulate material. Prior to the present invention, however, such valves would tend to leak after a period of operation because the valve element or plate would not seal due to the accumulations of material and misalignment. Also with prior valves, the mechanism for rotating the valve included an operating shaft which is located in the material flowpath. This can be a particular problem with abrasive materials such as cement clinker because the operating shaft will tend to be worn by the continuous exposure to the abrasive material.

SUMMARY

It is therefore the principal object of this invention to provide a flow control valve for particulate material which is capable of sealing against the flow of particulate material and against differential pressure on opposite sides of the valve while maintaining an adequate seal.

The foregoing and other objects will be carried out by providing a valve for controlling the flow of material comprising means defining a generally vertically oriented conduit; an arcuate valve plate having a leading edge means for rotating said valve plate in one direction for moving said valve plate into said conduit for closing said conduit and for rotating said valve plate in the other direction for moving said valve plate out of said conduit for opening said conduit; and a seal block mounted on said conduit for receiving the leading edge of said valve plate when said valve plate is in a position to close said conduit; said seal block having a configuration which substantially prevents material from accumulating therein.

While the invention is particularly adapted for use on cement clinker cooler applications, it should be understood that the valve can be used in various applications to empty material from bins, hoppers or any other type of apparatus that is used to hold particulate material.

The valve according to the present invention has greater sealing capabilities in retaining material and creating an air lock than prior valves of this type. This is important when using a single valve for controlling the flow of material into an apparatus that transports the material to various holding locations. In applications that require a differential pressure on opposite sides of the valve such as a pressurized bin or hopper, the sealing capabilities of the valve are very important. The sealing capability of the present invention is obtained by use of a machined seal block of a defined configuration that is inserted in the conduit at the front or leading edge of the valve. The seal block is shaped so that upon closing of the valve gate, the upper part of the block will stop the flow of material as the gate or valve plate passes by. The gate will then continue closing and when it reaches the bottom part of the seal block which is free of any material build-up, the gate will then contact the seal block and maintain the seal. The absence of material build-up on the bottom of the block is the achieved by the shape or configuration of the block.

The invention also provides a wiper seal at the top rear of the valve plate that keeps the material from falling down behind the gate as it opens and closes. This also maintains the seal against air pressure. The wiper seal is adjustable from outside the valve.

The pivot shaft of the gate is located out of the falling material stream. This insures that it is protected from wear and the possibility of material being wedged between the valve body and the shaft.

BRIEF DESCRIPTION OF THE DRAWING

The invention will be described in connection with the annexed drawing wherein:

FIG. 1 is a sectional view of the valve according to the present invention;

FIG. 2 is sectional view taken on the line 2—2 of FIG. 1; and

FIG. 3 is a fragmentary view taken on the line 3—3 of FIG. 1 showing the seal element.

DESCRIPTION OF THE PREFERRED EMBODIMENT

Referring to the drawing, the valve according to the present invention is generally indicated at 1 and includes a generally vertically oriented conduit 10 for the flow of material from an upper inlet 11 to a lower discharge outlet 12. In a given application, the conduit 10 may be connected by a flange 13 to the bottom of a hopper for particulate material or dust such as the hopper or plenum of a cement clinker cooler. Similarly, the outlet or lower end 12 may have a flange 14 for connection to a further conduit or conveying system. Either the upper end 11 or lower end 12 or both may be exposed to a pressure higher than atmospheric or one end may be exposed to a higher pressure than the other end.

The valve element is generally indicated at 20 and includes an arcuate valve plate 21 having a leading edge 22 and a trailing edge 23. The valve element 20 includes a shaft 25 mounted for rotation about its own axis by means of bearings 26 and 27 (FIG. 2). As can be seen from FIG. 2 the shaft 25 is generally perpendicular to the flow path for material through the conduit 10 and is positioned out of the flow of material through the conduit so that it is not exposed to the abrasive action of the particulate material. The valve element also includes means for connecting the valve plate 21 to the shaft. In the illustrated embodiment this means includes a pair of horizontally spaced apart first plates 30 and 31 (FIG. 2) extending from the valve plate 21 to the shaft 25. Each of these plates 30 and 31 is connected by suitable keying means 32 to the shaft 25. A second plate 35 is positioned between the first plates 30 and 31 for retaining material in the conduit 10 when the valve is open. In the preferred form, the second plate 35 includes a dog-leg 36 (FIG. 1) to aid the return of material to the conduit when the valve is closed.

The valve of the present invention also includes a hood or cover plate 40 mounted on the conduit 10 for receiving the valve plate 21 when the valve is open for preventing foreign material from entering the conduit and preventing particulate material from escaping the conduit. This hood includes a lower plate 41 and a generally arcuate shaped cover element 42. (A guide 80 is mounted on each side of the conduit 10 (FIG. 2) for guiding movement of the valve plate 81.)

The valve according to the present invention includes a seal block 50 best shown in FIGS. 1 and 3 mounted on one side of the conduit for receiving the leading edge 22 of the valve plate 21 when the element is closed. The seal block 50 has a configuration which substantially prevents material from accumulating in the seal block. The seal block 50 included an upper element 51 which extends into the conduit 10 by an amount sufficient to inhibit the flow of material from the upper end 11 to the lower end 12 from entering the recess 52 which receives the leading edge 22. The block 50 has a lower surface 55 which is at an angle so that the leading edge 22 seats against the edge 55 and provides a seal. The inclined surface 55 is at an angle steep enough to ensure that any material which might enter in the recess will easily fall out of the recess into the conduit when the valve element is open. It should be noted that the space 56 between the top surface 21a and element 51 is kept to a minimum clearance to reduce the chance of material resting on surface 21a when the valve is closed from falling down the surface into the recess 52. The leading edge 22 should have a shape so that in the closed position (FIG. 1), it abuts the surface 55.

The invention also includes a top wiper seal element generally indicated at 60 which includes a wiper element 61 which is preferable a replaceable elastomeric member which seals against the top surface 21a. This element 60 may include an outer plate 62 and fasteners 63 which permit adjustment of the elastomeric member 61. By loosening fasteners 63, the position of the elastomeric member 61 may be adjusted relative to the conduit 10 and valve member 21.

In the preferred form, the shaft 25 is connected to a suitable means 70 for rotating the shaft and therefor moving or rotating the valve plate 21 through a limited arc. This means 70 may include a hydraulic or air operated piston cylinder means 71 well know in the art including conduits 72 and 73 for connection to an operating fluid and a shaft 74 connected by means of a pin 75 to a crank arm 76 which is connected by means of a sleeve 77 to the shaft 25. When the piston 74 is in the inward position shown in solid lines in FIG. 1, the valve element 21 is in a position to close the conduit 10 and seal against the surface 55 of seal block 50. When fluid is supplied through conduit 72 to extend the cylinder 74 to the position shown is dotted lines in FIG. 1, the valve element 20 is rotated through a limited arc into the hood 40 to the position shown by dotted lines in FIG. 1. In this position the conduit 10 is open to permit material to flow from the upper end 11 through the conduit to the outlet end 12. When the valve member is in the position shown in dotted lines, material may flow through conduit 10. Thus, the piston cylinder means 70, crank arm 76, shaft 25 and plates 30, 31 and 35 comprise means for rotating the valve plate 21 in one direction for moving the valve plate into the conduit for closing the conduit and for rotating the valve plate in the other direction for moving the valve plate out of the conduit for opening the conduit.

It will be seen that the shaft 25 is located out of the material flow through the conduit. The dog-leg shape of plate 35 is such that in the open position, if material should enter the hood 40, the plate 35 will prevent it from getting behind the valve element and the shaft 25. Closing of the valve will result in the material being dumped back into the conduit 10. As the valve is opened the wiper element 61 serves to clean the top surface 21a of the valve element.

From the forqoing it will be seen that the objects of the invention have been carried out. A seal of the valve element is assured by the clean recess 52 which is accomplished by the shape of the seal block 50. The seal against differential pressure across the conduit 10 is also maintained by the upper wiper seal 60.

It is intended that the foregoing be a description of a preferred embodiment and that the invention be limited solely by that which is within the scope of the appended claims.

I claim:

1. A valve for controlling the flow of material comprising: means defining a generally vertically oriented conduit; an arcuate valve plate having a leading edge; means for rotating said valve plate in one direction for moving said valve plate into said conduit for closing said conduit and for rotating said valve plate in the other direction for moving said valve plate out of said conduit for opening said conduit; and a seal block mounted on said conduit for receiving the leading edge of said valve plate when said valve plate is in a position to close said conduit; said seal block having a shape to define a recess for receiving the leading edge of said valve plate, said recess having a lower surface inclined downwardly and inwardly toward said conduit whereby material which may enter said recess will tend to fall out of said recess to said conduit to define a configuration which substantially prevents material from accumulating therein.

2. A valve according to claim 1 wherein said seal block includes an upper element which extends into said conduit by an amount sufficient to inhibit flowing material through said conduit from entering said recess.

3. A valve according to claim 2 further comprising a wiper seal mounted on said conduit above said valve plate for removing from said valve plate material which may have accumulated on the valve plate.

4. A valve according to claim 3 wherein said means for rotating said valve plate includes a shaft mounted for rotation about its own axis and means for connecting said valve plate to said shaft and said shaft is positioned out of the normal flow path of material through said conduit.

5. A valve according to claim 3 wherein said means for connecting said valve plate to said shaft includes a pair of horizontally spaced apart first plates extending from said valve plate to said shaft and a second plate positioned between said first plates for retaining material in said conduit when the valve is in a position so that conduit is open.

6. A valve according to claim 5 wherein said second plate has a dog-leg shape.

7. A valve according to claim 6 further comprising guide means on the side of said conduit for guiding the movement of said valve plate.

8. A valve according to claim 6 further comprising a hood mounted on said conduit for receiving said valve plate when said valve is moved out of said conduit.

* * * * *